(12) United States Patent
Dillaway et al.

(10) Patent No.: US 7,549,051 B2
(45) Date of Patent: Jun. 16, 2009

(54) LONG-LIFE DIGITAL CERTIFICATION FOR PUBLISHING LONG-LIFE DIGITAL CONTENT OR THE LIKE IN CONTENT RIGHTS MANAGEMENT SYSTEM OR THE LIKE

(75) Inventors: Blair Brewster Dillaway, Clyde Hill, WA (US); Brian LaMacchia, Seattle, WA (US); John Manferdelli, Redmond, WA (US); Muthukrishnan Paramasivam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 11/077,051

(22) Filed: Mar. 10, 2005

(65) Prior Publication Data

US 2006/0206712 A1    Sep. 14, 2006

(51) Int. Cl.
*H04L 9/00* (2006.01)
(52) U.S. Cl. .................. 713/176; 713/156; 713/157; 713/173; 713/175; 713/178; 713/179; 713/180
(58) Field of Classification Search ............... 713/156, 713/157, 173, 175, 178, 179, 180, 176
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,926,479 A | 5/1990 | Goldwasser et al. | 380/23 |
| 4,953,209 A | 8/1990 | Ryder, Sr. et al. | 380/23 |
| 4,977,594 A | 12/1990 | Shear | 380/4 |
| 5,050,213 A | 9/1991 | Shear | 380/25 |
| 5,103,392 A | 4/1992 | Mori | 395/725 |
| 5,103,476 A | 4/1992 | Waite et al. | 380/4 |

(Continued)

FOREIGN PATENT DOCUMENTS

EP    0 715 246 B1    6/1996

(Continued)

OTHER PUBLICATIONS

Cheun Ngen Chong, Sandro Etalle, and Pieter H. Hartel; "Comparing Logic-Based and XML-Based Rights Expression Languages"; On The Move to Meaningful Internet Systems 2003: OTM 2003 Workshops; Saturday, Oct. 25, 2003; pp. 779-792.*

(Continued)

*Primary Examiner*—Carl Colin
(74) *Attorney, Agent, or Firm*—Woodcock Washburn LLP

(57) ABSTRACT

A digital certificate is employed to produce a digital signature for a digital construct. In the digital certificate is set forth a certificate validity period defining for the digital certificate a time period during which the digital certificate is to be honored as valid for producing digital signatures, and a signature validity period defining for each digital signature produced based on the digital certificate a time period during which the digital signature is to be honored as valid.

20 Claims, 4 Drawing Sheets

U.S. PATENT DOCUMENTS

| | | | |
|---|---|---|---|
| 5,109,413 A | 4/1992 | Comerford et al. | 380/4 |
| 5,117,457 A | 5/1992 | Comerford et al. | 380/3 |
| 5,193,573 A | 3/1993 | Chronister | 137/315 |
| 5,222,134 A | 6/1993 | Waite et al. | 380/4 |
| 5,261,002 A | 11/1993 | Perlman et al. | 380/30 |
| 5,319,705 A | 6/1994 | Halter et al. | 380/4 |
| 5,373,561 A * | 12/1994 | Haber et al. | 713/157 |
| 5,410,598 A | 4/1995 | Shear | 380/4 |
| 5,473,692 A | 12/1995 | Davis | 380/25 |
| 5,490,216 A | 2/1996 | Richardson, III | 380/4 |
| 5,509,070 A | 4/1996 | Schull | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,673,316 A | 9/1997 | Auerbach et al. | 380/4 |
| 5,710,887 A | 1/1998 | Chelliah et al. | 395/226 |
| 5,715,403 A | 2/1998 | Stefik | 395/244 |
| 5,765,152 A | 6/1998 | Erickson | 707/9 |
| 5,809,144 A | 9/1998 | Sirbu et al. | 380/25 |
| 5,845,281 A | 12/1998 | Benson et al. | 707/9 |
| 5,892,900 A | 4/1999 | Ginter et al. | 395/186 |
| 5,903,882 A * | 5/1999 | Asay et al. | 705/44 |
| 5,917,912 A | 6/1999 | Ginter et al. | 380/24 |
| 5,953,420 A | 9/1999 | Matyas, Jr. et al. | 380/21 |
| 6,073,124 A | 6/2000 | Krishnan et al. | 705/59 |
| 6,078,909 A | 6/2000 | Knutson | 705/59 |
| 6,094,487 A | 7/2000 | Butler et al. | 380/270 |
| 6,189,146 B1 | 2/2001 | Misra et al. | 717/11 |
| 6,219,652 B1 | 4/2001 | Carter et al. | 705/59 |
| 6,226,618 B1 | 5/2001 | Downs et al. | 705/1 |
| 6,233,567 B1 | 5/2001 | Cohen | 705/59 |
| 6,289,452 B1 | 9/2001 | Arnold et al. | 713/175 |
| 6,330,670 B1 | 12/2001 | England et al. | 713/2 |
| 6,343,280 B2 | 1/2002 | Clark | 705/55 |
| 6,367,009 B1 * | 4/2002 | Davis et al. | 713/166 |
| 6,574,609 B1 | 6/2003 | Downs et al. | 705/50 |
| 6,574,612 B1 | 6/2003 | Baratti et al. | 705/59 |
| 6,584,565 B1 * | 6/2003 | Zamek | 713/156 |
| 6,681,017 B1 | 1/2004 | Matias et al. | 380/277 |
| 6,766,450 B2 * | 7/2004 | Micali | 713/158 |
| 6,832,319 B1 | 12/2004 | Bell et al. | 713/193 |
| 6,895,507 B1 * | 5/2005 | Teppler | 726/19 |
| 6,990,684 B2 * | 1/2006 | Futamura et al. | 726/18 |
| 2001/0052077 A1 | 12/2001 | Fung et al. | 713/184 |
| 2001/0056539 A1 | 12/2001 | Pavlin et al. | 713/193 |
| 2002/0013772 A1 | 1/2002 | Peinado | 705/51 |
| 2003/0194094 A1 | 10/2003 | Lampson et al. | 380/282 |
| 2004/0125959 A1* | 7/2004 | Beuque et al. | 380/279 |
| 2005/0091540 A1* | 4/2005 | Dick et al. | 713/201 |
| 2005/0188053 A1* | 8/2005 | Shimamura et al. | 709/217 |

FOREIGN PATENT DOCUMENTS

| | | |
|---|---|---|
| EP | 0 715 247 B1 | 6/1996 |
| WO | WO 93/01550 A1 | 1/1993 |
| WO | WO 96/13013 A1 | 5/1996 |
| WO | WO 96/24092 A3 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A1 | 6/1998 |
| WO | WO 98/37481 A1 | 8/1998 |
| WO | WO 00/15221 A1 | 3/2000 |
| WO | WO 00/58811 A3 | 10/2000 |
| WO | WO 00/59150 A2 | 10/2000 |

OTHER PUBLICATIONS

Xin Wang, Thomas DeMartini, Barney Wragg, M. Paramasivam, and Chris Barlas; "The MPEG-21 Rights Expression Language and Rights Data Dictionary"; IEEE Transactions on Multimedia, vol. 7, No. 3, Jun. 2005; pp. 408-417.*

"Aladdin Knowledge Systems Partners with Rights Exchange, Inc. to Develop a Comprehensive Solution for Electronic Software Distribution," Aug. 3, 1988, 5 pages.

Armati, D., "Tools and standards for protection, control and presentation of data," Apr. 3, 1996, 17 pages.

Benjamin, R. et al., "Electronic markets and virtual value chains on the information superhighway," Sloan Management Rev., Winter, 1995, 62-72.

Cassidy, "A Web developers guide to content encapsulation technology," Apr. 1997, 5 pages.

Cox, B., "Superdistribution," Idees Fortes, Sep. 1994, 2 pages.

Cox, B., "What if There Is A Silver Bullet," J. Object Oriented Programm., Jun. 1992, 8-9 and 76.

Griswold, G.N., "A Method for Protecting Copyright on Networks," IMA Intell. Property Project Proceedings, Jan. 1994, 1(1), 169-178.

Hauser, R.C., "Does licensing require new access control techniques?" Aug. 1993, 9 pages.

Hudgins-Bonafield, C. "Selling Knowledge on the Net," Network Computing, Jun. 1, 1995, 102-109.

"IBM spearheading intellectual property protection technology for information on the Internet," May 1996, 3 pages.

"Technological Solutions Rise to Complement Law's Small Stick Guarding Electronic Works," Information Law Alert, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," D-Lib Magazine, Sep. 1997. 9 pages.

Linn, R.J., "Copyright and Information Services in the Context of the National Research and Education Network," IMA Intell. Property Project Proceedings, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," PC Week, Nov. 20, 1995, 12(48), 1 page.

Moeller, M., "IBM takes charge of E-commerce; Plans client, server apps based on SET," Apr. 1996, 4 pages.

Pemberton, J., "An Online Interview with Jeff Crigler at IBM InfoMarket," Jul. 1996, 6 pages.

"LicensIt: kinder, gentler copyright? Copyright management system links content, authorship information," Seybold Report on Desktop Publishing, 1996, 10(11), 2 pages.

Sibert, O. et al., "The DigiBox: A Self-protecting Container for Information Commerce," First USENIX Workshop on Electronic Commerce, Jul. 11-12, 1995, 171-183.

Sibert, O. et al., "Securing the Content, Not the Wire, for Information Commerce," Jul. 1995, 1-11.

Stefik, M., "Trusted Systems," Mar. 1997, 8 pages.

Stefik, M., "Shifting the Possible: How Trusted Systems and Digital Property Rights Challenge Us to Rethink Digital Publishing," Technical Perspective, 1997, 137-159.

"Rights Management in the Digital Age: Trading in Bits, Not Atoms," Spring, 1997, 4, 3 pages.

Weber, R., "Digital Right Management Technology," Oct. 1995, 35 pages.

White, S.R. et al., "ABYSS: An Architecture for Software Protection," IEEE Trans. On Software Engineering, Jun. 1990, 16(6), 619-629.

White, S.R. et al., "ABYSS: A trusted architecture for software protection,"IEEE Symposium on Security and Privacy, Apr. 27-29, 1987, 38-51.

Ramanujapuram, A. et al., "Digital Content & Intellectual Property Rights: A specification language and tools for rights management," Dec. 1998, 20-23 and 26.

Thompson, C.W., et al., "Digital licensing," *IEEE Internet Computing,* 2005, 9(4).

Olson, M., et al., "Concurrent access licensing," *UNIX Review,* 1988, 6(9), 67-72 (from Dialog Accession No. 01254918).

Unknown, Finland—Data fellows secures ICSA certification, *Newsbytes,* 1998, (from DialogClassic Web(TM), File 9, Accession No. 01451058, 2 pages).

Unknown, "Black box crypton defies the hackers," *Electronic Weekly,* 1985, 1257, p. 26 (from DialogClassic Web™ file 275, Accession No. 01116377).

Unknown, "Solution for piracy," *Which Computer,* 1983, p. 29 (from DialogClassic Web™ file 275, Accession No. 01014280).

From PR Newswire, "Sony develops copyright protection solutions for digital music content," 1999, http://www.findarticles.com.

From http://www.findarticles.com, "BreakerTech joins copyright management market," *Computer International,* 1999.

Kahn, R.E, "Deposit, Registration and Recordation in an electronic copyright management system," *IMA Intellectual Property Project Proceedings,* 1994, 1(1), 111-120.

"Aladdin acquires the assets of Micro Macro Technologies," *Business Wire,* 1999 http://www.findarticles.com.

* cited by examiner

LONG-LIFE DIGITAL CERTIFICATION FOR PUBLISHING LONG-LIFE DIGITAL CONTENT OR THE LIKE IN CONTENT RIGHTS MANAGEMENT SYSTEM OR THE LIKE

TECHNICAL FIELD

The present invention relates to a digital content distribution or rights management (RM) system whereby access to digital content is provided to one or more users by an authorized content distributor. More particularly, the invention relates to providing a long-life digital certificate when publishing the content or the like such that authenticity of the content can be validated according to the certificate for an extended period of time.

BACKGROUND OF THE INVENTION

Digital content distribution is widely used to distribute software, data, and documents where the origin and authenticity of the data is an important consideration for the receiving party. Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders the digital content with the aid of appropriate rendering software such as an audio player, a text displayer, etc. on a personal computer or other hardware.

In one scenario, a digital content owner wishes to distribute digital content to many users or recipients in a form allowing the recipient to assess the origin and validity of the content. In such a scenario, the content may be computer software or data. The content owner or publisher derives value from the use of its products, but the recipients may be reluctant to use it without proof of its origin and integrity.

In another scenario, a content owner or rights-owner such as an author, a publisher, a broadcaster, etc., wishes to distribute such digital content to each of many users or recipients in exchange for a license fee or some other consideration. In such scenario, then, the content may be an audio recording, a multimedia presentation, etc., and the purpose of the distribution is to generate the license fee. Such content owner, given the choice, would likely wish to restrict what the user can do with such distributed digital content. To do this, they need to target a rendering device, or software application, that will enforce the desired restrictions. This requires the ability to generate a content license which: 1) identifies the content; 2) describes the desired use restrictions; and 3) allows the rendering device or software to validate the license as coming from an authorized content owner.

The second scenario can be extended in a straightforward manner to encompass a content developer, such as an employee in or member of an organization, that wishes to distribute such digital content to one or more other employees or members in the organization or to other individuals outside the organization. Here, the distribution of the content is more akin to organization-based content sharing in a confidential or restricted manner, as opposed to broad-based distribution in exchange for a license fee or some other consideration.

In such extended second scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. As before, this requires the ability to generate a content license which: 1) identifies the content; 2) describes the desired use restrictions; and 3) allows the rendering device or software to validate the license as coming from an authorized content owner.

As described in the preceding scenarios, publication of digital content is likely to include digitally signing the content to produce a digital signature that can be employed to validate the content's owner and its integrity at some later point. Publication of such content may in addition or in the alternative include issuing a publishing license and/or use license or the like for the content and digitally signing the issued license to produce a digital signature for similar purposes. In either situation, and as is known, authority to digitally sign may be granted from a higher authority to the publisher or licensor by way of issuance of a digital certificate from the higher authority, where the digital certificate includes a public-private cryptographic key pair, and where the digital signature is based on the private key and validated based on the public key.

Thus, the publisher or licensor attaches to the digital signature the digital certificate, and perhaps a chain of certificates leading back to a root trust authority that is known to an entity that would validate the digital signature. In particular, the entity would be in possession of a public key of the root trust authority and would employ same to validate a digital signature of a first 'root' certificate in the chain. Assuming the signature of the root certificate does indeed validate, a public key in the root certificate would be employed to validate the signature of the next certificate in the chain, and so on until the signature of the last certificate in the chain is validated and the public key therein is then employed to validate the digital signature of the content or license.

In the prior art, in the situation where a digital certificate is employed to publish content, an issue exists in that the digital certificate and the private key and signature thereof have an expiration after which such certificate and private key and signature thereof are not guaranteed by the issuer. For example, in the case of an X.509 digital certificate, a date is specified in the certificate after which the signature, the private key, and the certificate expires. Reasons for such an expiration are many and varied, but typically are based on the fact that the issuer of the certificate is not required to guarantee the certificate after the expiration thereof, and accordingly is not responsible for performing ministerial tasks with regard to the certificate, such as possible revocation if need be. At any rate, an expired certificate from an issuer usually is replaced by a newer certificate from the issuer, likely as part of a retail transaction where the issuer receives some sort of remuneration for the newer certificate.

Thus, from the point of view of the issuer of a certificate, an issued certificate should expire after a relatively short period of time, both to lessen the liability of the issuer and to provider the issuer with an amount of revenue from issuing a newer certificate. However, from the point of view of a publisher of digital content using such a certificate to digitally sign the content, the certificate should remain valid for an extended period of time, if in fact the certificate expires at all, especially inasmuch as an expired certificate typically cannot be employed to validate and render content in an RM system. Of course, based on the tension between such two opposing points of view, a digital certificate usually expires in some period of time on the order of six months to two or three years.

Nevertheless, even such a period of time is oftentimes not long enough for the consumer of the content. For example, commercial software distributed over the Internet may have value to customers for five years or more. For digital content such as a musical recording, with a license that provides for use of the content in perpetuity, the consumer would not wish to have the usefulness of such license diminished because the license or the content is validated based on a digital certificate that expires after a year or two.

To alleviate such a situation, and in the prior art, a workaround solution has been developed whereby use of a certificate that expires also requires an additional signature based on another root trust authority, where the additional signature is based on a digital certificate from the another root trust authority that never expires. However, doing so requires that the another root trust authority assume the aforementioned liabilities of guaranteeing the certificate in perpetuity and performing ministerial tasks with regard to the certificate in perpetuity. As may be appreciated, such liabilities can be quite burdensome and should be avoided if at all possible. In addition, such a root authority becomes a single point of failure whose compromise would prevent validation of digital signatures on very large bodies of content potentially from multiple owners or publishers.

Accordingly, a need exists for a long-life digital certificate for long-life digital content or the like, whereby the certificate can be employed to validate the content for a relatively long period of time, but where the liabilities and costs associated with issuing the certificate and maintaining information on its validity are mitigated. In particular, a need exists for such a certificate where the time during which a signature based on the certificate may be created, and hence the associated private key used, is separated out from the expiration of the certificate. More particularly, a need exists for such a certificate where the validity of the certificate and ability to use same to validate a digital signature has a relatively longer life span, while the time during which a digital signature may be created, and hence the private key used, has a relatively shorter life span. In addition, there are many instances where one would like to provide specific restrictions within the certificate governing what types of content may be signed. Thus, even though the certificate and the private key thereof may be employed in the creation of digital signatures only for the relatively shorter life span, the digital signature provided based on such certificate may be validated for the relatively larger life span.

SUMMARY OF THE INVENTION

The aforementioned needs are satisfied at least in part by the present invention in which a computer-readable medium has stored thereon a digital structure defining a digital certificate for being employed to produce a digital signature for a digital construct. The digital certificate identifies the public key of a public-private key pair associated therewith and controlled by the certificate owner. The private key is employed to produce the digital signature and the public key is employed to validate the digital signature. In the data structure, a first field sets forth the public key associated with the digital certificate. In addition, a second field sets forth a signature creation validity period defining for the digital certificate itself and the private key thereof a time period during which the private key may be used to create digital signatures which may be validated using the certificate. Also, a third field separate from the second field sets forth a certificate validity period during which time the certificate is considered valid for the purpose of validating digital signatures produced using the associated private key. In essence, a digital signature may be validated based on the certificate if the certificate is still valid according to the certificate validity period; the signature was created during the signature creation validity period; and the signed content matches any authorized content signature types set forth in the certificate.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
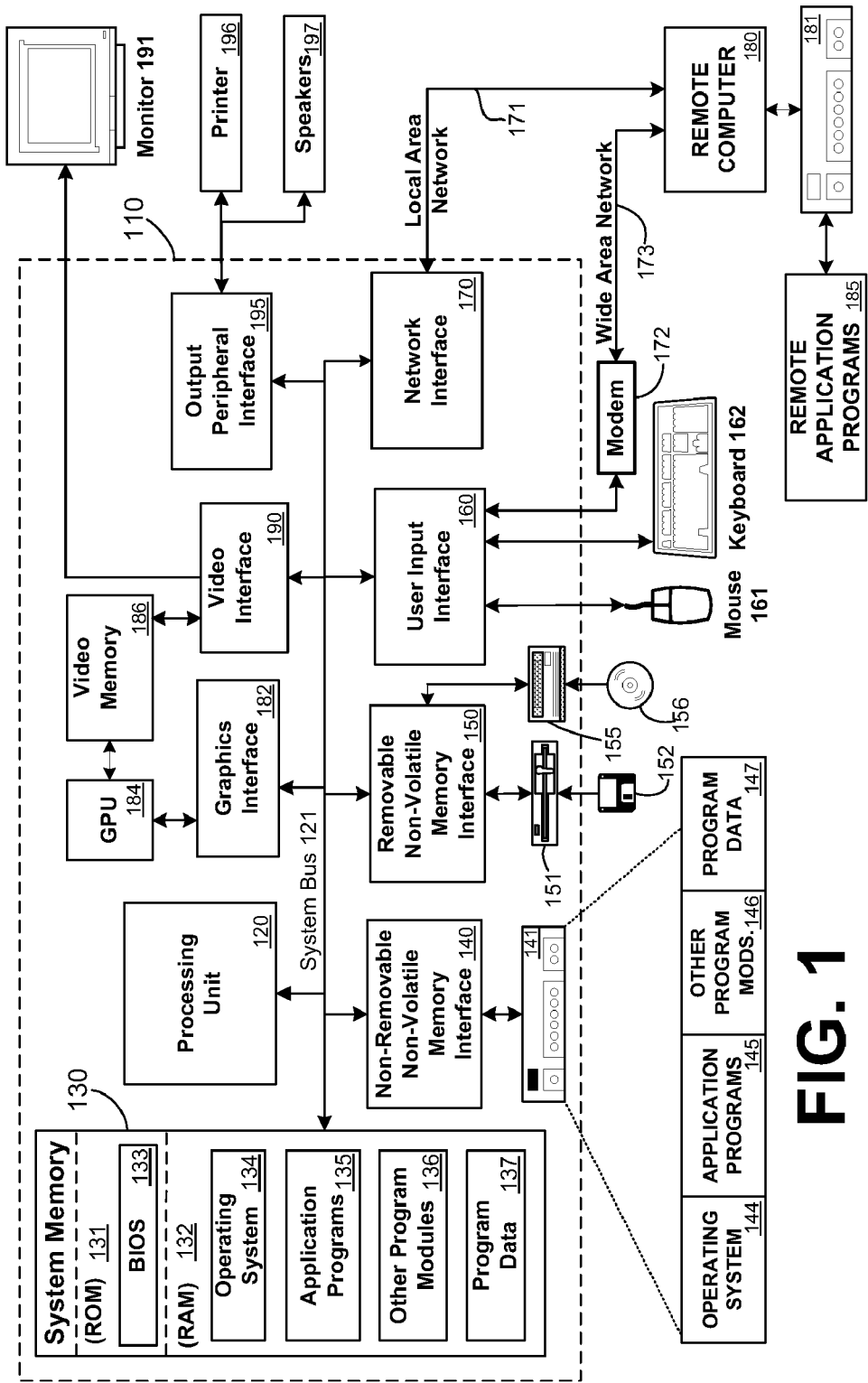
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
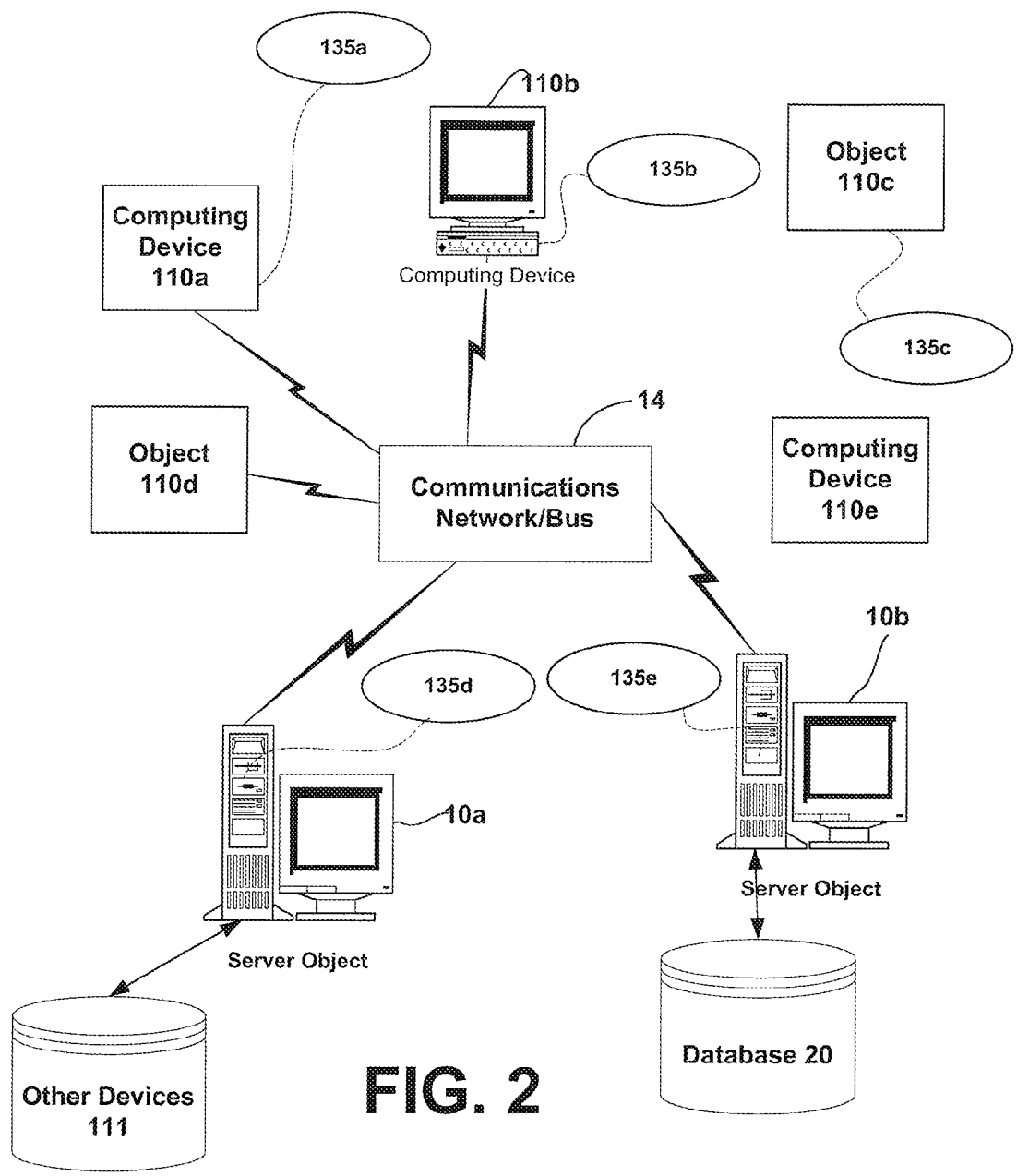
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110*c*, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 1Oa, 10b, etc., are interconnected via a communications network/bus 14, which may be a LAN, WAN, intranet, the Internet, etc., with a number of client or remote computing devices or objects 110a, 110b, 110c, 110d, 110e, etc., such as a portable computer, hand held computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices and databases 20.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
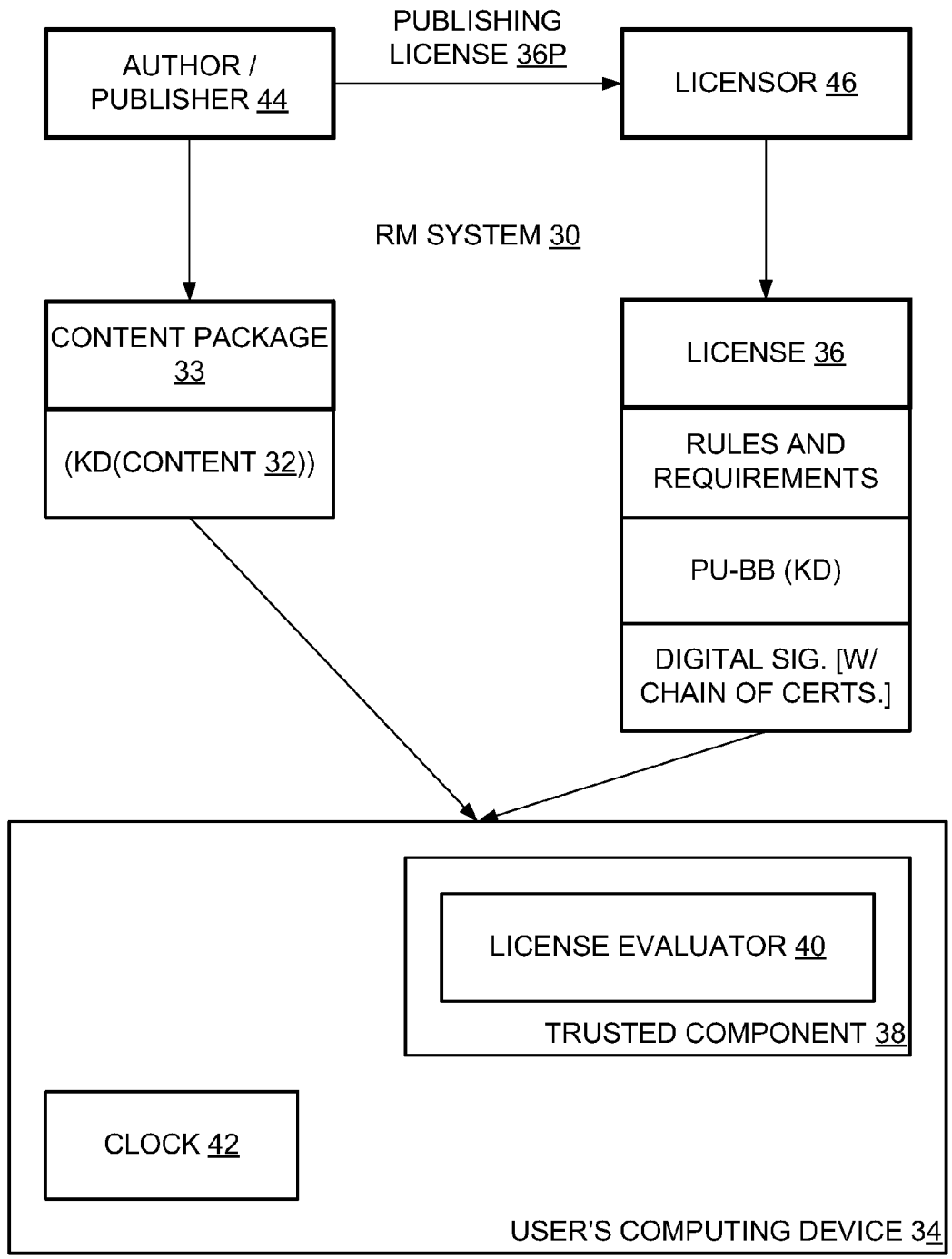
FIG. 3 is a block diagram showing an enforcement architecture of an example of a trust-based system, including a digital license as a digital structure in accordance with one embodiment of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed to users. Upon being received by the user, such user renders the digital content 32 with the aid of an appropriate rendering device such as a media player, text displayer, etc. on a personal computer 34 or the like.

Typically, a content owner or developer (hereinafter 'owner') distributing such digital content 32 wishes to restrict what the user can do with such distributed digital content 32. For example, the content owner may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, after distribution has occurred, such content owner has very little if any control over the digital content 32. An RM system 30, then, allows the controlled rendering of arbitrary forms of digital content 32, where such control is flexible and definable by the content owner of such digital content. Typically, content 32 is distributed to the user in the form of a package 33 by way of any appropriate distribution channel. The digital content package 33 as distributed may include the digital content 32 encrypted with a symmetric encryption/decryption key (KD), (i.e., (KD(CONTENT))), as well as other information identifying the content, how to acquire a license for such content, etc.

The trust-based RM system 30 allows an owner of digital content 32 to specify license rules that must be satisfied before such digital content 32 is allowed to be rendered on a user's computing device 34. Such license rules can include the aforementioned temporal requirement, and may be embodied within a digital license or use document (hereinafter 'license') 36 that the user/user's computing device 34 (hereinafter, such terms are interchangeable unless circumstances require otherwise) must obtain from the content owner or an agent thereof. Such license 36 also includes the decryption key (KD) for decrypting the digital content, perhaps encrypted according to a key decryptable by the user's computing device 34. As seen in FIG. 3, such encrypting key is a public key of the user's computing device 34 (PU-BB), and the user's computing device 34 presumably has the corresponding private key (PR-BB) by which (PU-BB(KD)) may be decrypted.

The content owner for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 can specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered.

As set forth above, the license 36 with (PU-BB(KD)) in effect authorizes an entity in possession of (PR-BB) to access (KD) and thereby access the content 32 encrypted according to such (KD), presuming of course that the entity abides by all conditions as set forth in the license 36. As should be appreciated, though, other types of licenses 36 may exists within the RM system 30.

For example, it may be appreciated that in one scenario the author or publisher 44 of the content 32 may authorize a particular licensor 46 to issue a license 36 for corresponding content 32 by providing the licensor 46 with a publishing license 36p. As may be appreciated, such publishing license 36p is similar to the license 36 in that such publishing license 36p likely includes the decryption key (KD) for decrypting the digital content 32, here encrypted according to a public key of the licensor (PU-BB). Likewise, the publishing license 36p likely includes the rules and requirements for rendering the content 32. Here, however, such rules and requirements are to be inserted into the license 36 as issued by the licensor 46, and are not especially applicable to such licensor 46.

Note, though, that the publishing license 36p may indeed include other rules and requirements that are indeed applicable to the licensor 46. Accordingly, the licensor 46 should include a trusted component 38 with a license evaluator 40 in a manner akin to the user's computing device 34.

Although the present invention is applicable with respect to content 32 and licenses 36 from the aforementioned RM system 30, it is to be appreciated that such present invention is not in fact limited to the environment of such RM system 30. Instead, such RM system 30 merely sets forth one particular environment where a digital certificate of the present invention is applicable. In particular, and significantly, each type of license 36, 36p, etc. as proffered typically includes a digital signature for authentication/validation purposes. Likewise, other forms of digital constructs such as a piece of digital content 32 may also have such a digital signature for authentication/validation purposes.

As should be known, such a digital signature is typically constructed based on a first key from a pair of asymmetric keys, for example by performing some sort of hash on the underlying data to which the signature is attached and then encrypting the hash with the first key. Thereafter, the signature is validated by applying the second key from the pair of asymmetric keys, again for example by decrypting the encrypted hash and comparing the decrypted hash to another hash of the underlying data to which the signature is attached. If the hashes match, it can be presumed that the underlying data has not been altered and the underlying construct therefore can be authenticated. Correspondingly, if the hashes do not match, it can be presumed that the underlying data has in fact been altered and the underlying data therefore can not be authenticated.

Figure 4:
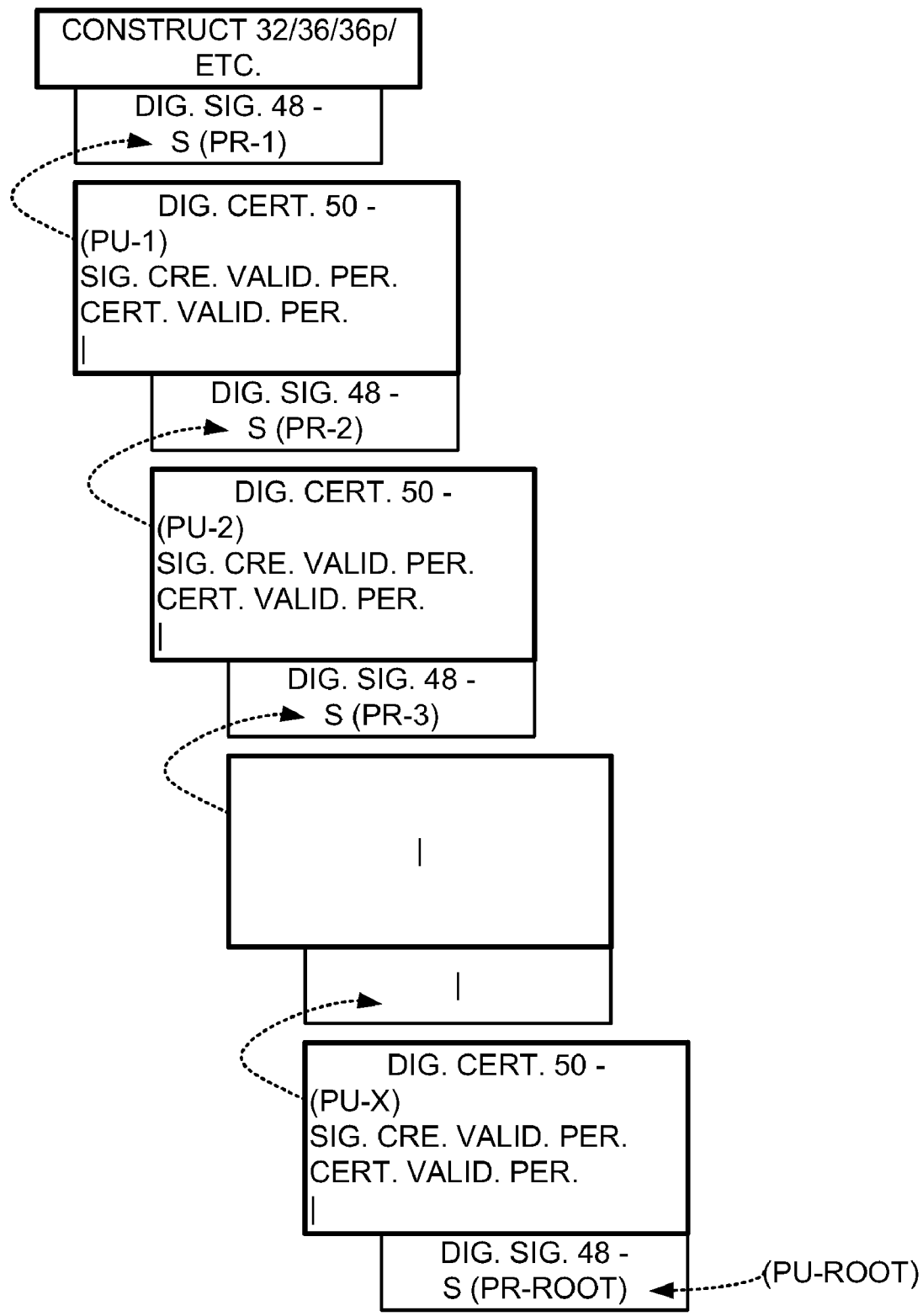
FIG. 4 is a block diagram showing the digital structure of FIG. 3 with a chain of digital certificates, each digital certificate setting forth both a certificate validity period and a signature validity period in accordance with one embodiment of the present invention.

As may be appreciated, and turning now to FIG. 4, each digital signature 48 is validated with reference to a digital certificate 50 from a root trust authority or a series or 'chain' of such certificates 50 leading back to such a root trust authority. Notably, each certificate 50 has an associated public-private key pair (PU-_, PR-_) and includes a digital signature 48 for authentication/verification purposes, and each signature 48 is constructed based on a private key and validated according to a corresponding public key.

As may be appreciated, in a chain of certificates 50 leading from a root trust authority to a particular license 36, 36p, etc. or piece of content 32 or the like, the root digital certificate 50 from the root trust authority includes a digital signature 48 based on a private key from the root trust authority (PR-ROOT) and is validated based on a corresponding public key (PU-ROOT) which is presumed to be available to the verifying entity. For each other digital certificate 50 in the chain and for the license 36, 36p, etc. or piece of content 32 or the like at the end of the chain, such other certificate 50 or license 36, 36p, etc. or piece of content 32 or the like includes a digital signature 48 based on a private key (PR-(N-1)) associated with the next certificate 50 in the chain toward the root trust authority, and is validated based on a corresponding public key (PU-(N-1)).

Accordingly, to validate a digital signature 48 on a license 36, 36p, etc., or a piece of content 32 or the like, a corresponding chain of certificates 50 back to a root trust authority is found, a corresponding public key of such root trust authority is found (PU-ROOT), and the found public key of the root trust authority is employed to validate the signature 48 of the root certificate 50. Assuming such validation succeeds, a public key (PU-X) for the next certificate 50 in the chain is found in the root certificate 50 and is employed to validate the signature 48 of the next certificate 50 in the chain. The process repeats until the signature 48 of the last certificate 50 in the chain is validated, at which point a public key (PU-1) is found in such last certificate 50 and employed to validate the signature 48 of the license 36, 36*p*, etc. or piece of content 32 or the like. Of course, if the validation of any signature 48 fails, the process ends and the license 36, 36*p*, etc. or piece of content 32 or the like is not authenticated. Typically, a RM system 30 will not honor a license 36, 36*p*, etc, a piece of digital content 32, or the like that is not authenticated.

Long-Life Digital Certificate 50

As was alluded to above, the prior art in digital certificates 50 may be best typified by the known X.509 certificate standard as promulgated by the International Telecommunication Union (ITU). Among other things, such X.509 certificate standard provides a particular certificate 50 with only a single validity period. Thus, such single provided validity period governs the time during which the private key (PR-_) associated with such certificate 50 can be employed to produce a digital signature 48 on a next certificate 50 in a chain or on a license 36 or piece of content 32 or other digital construct to which the certificate 50 is attached. In addition, such single provided validity period governs the time during which the produced signature 48 is itself valid based on the signer's certificate. Thus, in addition to validating a digital signature 48 based on whether the hash therein matches the underlying data, such digital signature 48 may also be validated based on whether the single validity period set forth in the certificate 50 employed to produce the signature 48 has expired.

However, and as was also alluded to above, setting a single validity period in a certificate 50 for both the certificate 50 itself and the private key thereof and also for signatures 48 produced based on the certificate 50 results in a certificate 50 and the private key thereof likely being defined to have a relatively short life span and by extension signatures 48 produced based thereon also having the same relatively short life span. Accordingly, in one embodiment of the present invention, and as seen in FIG. 4, a digital certificate 50 is provided with at least a pair of validity periods, including a certificate validity period defined for the certificate 50 itself and the private key thereof, and a signature validity period defined for signatures 48 produced based on the certificate 50. Thus, and in the present invention, a digital signature 48 is validated based on whether the hash therein matches the underlying data, whether the signature 50 was created during the signature creation validity period set forth in the certificate 50; whether the signature is applied to content matching the authorized content types; and whether the certificate validity period set forth in the certificate 50 spans the current time.

As should be appreciated, then, with the present invention, the certificate validity period within a certificate 50 should be set to give a signature 48 based on such certificate 50 a relatively longer life span, while the signature creation validity period within the certificate 50 should be set to give a digital signature 48 created based on the certificate 50 a relatively shorter life span. Thus, even though the certificate 50 and the private key thereof may be employed only for the relatively shorter life span as the basis for a signature 48 on another certificate 50 or a license 36 or piece of digital content 32 or the like, the signature 48 provided can be validated based on such certificate 50 for the relatively larger life span.

For example, then, it might be the case that a particular certificate 50 specifies a signature creation validity period on the order of a year or so and authorizes the creation of signatures for audio and video media content, while such certificate 50 also specifies a certificate validity period on the order of ten years or so. Of course, any appropriate validity period and corresponding expiration may be set without departing from the spirit and scope of the present invention. Note that a validity period may be specified according to both an expiration time and a start time. Thus, it may be that a particular validity period is set for ten years, starting on Mar. 1, 2006 at 12:01 AM, UTC, and ending on Mar. 1, 2016 at 12:01 AM, UTC.

As a result of employing both a certificate validity period and a signature creation validity period and perhaps a content type restriction within a certificate 50, the issuer of the certificate 50 is satisfied that the issued certificate 50 and associated private key will be used to create signatures for a relative short time and perhaps a restricted type of content, both to lessen the liability of the issuer and to provide the issuer with an amount of revenue from issuing a newer certificate 50. Likewise, a consumer of digital content 32 or the like to which the certificate 50 is associated is satisfied that signatures 48 based on the certificate 50 expire as late as possible, if in fact at all, especially inasmuch as an expired signature 48 typically cannot be employed to validate and render content 32 in an RM system 30.

It is to be appreciated that since the X.509 certificate standard as presently existing provides a particular X.509 certificate 50 with only a single validity period, such an X.509 certificate 50 in its present form cannot be employed in connection with the present invention to set forth both a certificate validity period and a signature validity period. It would be straightforward to add appropriate semantics to the X.509 certificate standard.

Thus, in one embodiment of the present invention, the certificate 50 is constructed according to an extensible Markup Language (XML) that defines a standard with both the certificate validity period and the signature validity period. Such an XML-defined standard should be apparent to the relevant public and therefore need not be set forth herein in any detail. For example, such XML-defined standard may be the MPEG Rights Expression Language (REL) as approved by the International Organization for Standardization (ISO), which already has the requisite syntactic forms designed in.

In one embodiment of the present invention, each of the signature creation validity period and optional authorized content types and the certificate validity period with regard to a certificate 50 is set forth within the certificate 50 as policy. Such policy may be any appropriate policy without departing from the spirit and scope of the present invention. For example, such policy may express a particular principal, a right granted, a type of digital construct with which the right can be exercised, and constraints on the right, which normally would include one or more of the aforementioned certificate validity period and signature validity period.

For example, as set forth within a particular certificate 50, a first policy:
Policy: 1
Principal: K1
Right: to digitally sign
Construct: content of type C1
Constraint: after time T1 and before time T2 (>T1) would grant rights to a principal named K1 that could be a particular user or type of user, the holder of the certificate 50, or the like. The right would be for K1 to use the certificate 50 to digitally sign a construct, where the construct is the specified content 32 of type C1. Significantly, the right is constrained in that such right may not be exercised before a time T1 nor after a time T2, and thus the period between T1 and T2 is the aforementioned signature creation validity period during which the certificate 50 and private key thereof can be employed to produce a digital signature 48 for the content 32 of type C1.

Notably, in one embodiment of the present invention, a certificate 50 may specify multiple signature creation validity periods and certificate validity periods. For example, the certificate 50 having the aforementioned first policy with regard to content 32 of type C1 and a first signature creation validity period for such first policy may also have a second policy with regard to a license 36 of type L1 and a second signature creation validity period for such second policy:

Policy: 2
Principal: K1
Right: to digitally sign
Construct: license of type L1
Constraint: after time T3 and before time T4 (>T3) Thus, such second policy would grant rights to the principal named K1 to use the certificate 50 to digitally sign a construct, where the construct is the specified license 36 of type L1. Here, the right is constrained in that such right may not be exercised before a time T3 nor after a time T4, and thus the period between T3 and T4 is the aforementioned second signature creation validity period during which the certificate 50 and private key thereof can be employed to produce a digital signature 48 for the license 36 of type L1.

Note that no certificate validity period has thus far been specified for the certificate 50 with the aforementioned first and second policies. As may be appreciated, such a certificate validity period may for example be specified in the certificate 50 as a third policy:

Policy: 3
Principal: any holder of certificate 50
Right: to validate signature 48 produced based on certificate 50
Construct: license of type L1 or content of type C1
Constraint: after time T1 (<T2) and before time T5 (>T3, T4)

Thus, such third policy would grant rights to any holder of the certificate 50 to use the certificate 50 to validate a signature 48 produced based on such certificate 50 and with regard to the specified license 36 of type L1 or the specified content 32 of type L1. Here, the right is constrained in that such right may not be exercised before time T1 nor after a time T5 is the signature validity period during which the certificate 50 can be employed to validate a digital signature 48 based on such certificate 50. As set forth, the certificate validity period T1-T5 will typically span the digital signature validity periods T1-T2 and T3-T4, and extends beyond T3 and T4 to a time T5 which is presumably a much more distant time such that the certificate validity period T1-T5 is a relatively large span and the signature creation validity periods T1-T2 and T3-T4 are relatively short spans.

Of course, additional policies may be set forth within the certificate 50 to specify additional certificate validity periods, as well as additional signature creation validity periods. As may be appreciated, such additional certificate validity periods (and such additional signature creation validity periods) may be specific to particular principals, rights, and/or constructs.

As may now be appreciated, by setting forth policies within certificates 50 that are chained to a digital construct, a trusted component 38 validating the signature 48 on the construct validates the certificates 50 in the chain and enforces any policy set forth in each such certificate 50. Thus, by use of policy-bearing certificates 50, and in one embodiment of the present invention, policy with respect to using a particular piece of content 32, for example, may be specified in a corresponding license 36 and/or may be specified in the certificates 50 chained to the license 36 and/or the content 32. In fact, it may be the case that the license 36 for the content 32 specifies no policy but instead merely includes decryption key (KD) for decrypting the content 32 and a chain of certificates 50 that in fact set forth policy that is to be applied to the content 32.

CONCLUSION

A certificate 50 may set forth therein a signature creation validity period during which the certificate 50 may be employed to produce a signature 48 for any authorized type of content, and a certificate validity period during which such signature 48 may be validated based on the certificate 50. More generally, a certificate 50 may set forth policy regarding longevity, publication actions, rendering actions, identity certification, and the like. The policy is fully contained in the certificate 50 and therefore is easily communicated to recipients of constructs to which the certificate 50 has been chained and the like.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a long-life digital certificate 50 is provided for long-life digital content 32 or the like, whereby the certificate 50 can be employed to validate the content 32 for a relatively long period of time, but where the liabilities associated with issuing the certificate 50 are mitigated. The certificate 50 includes an expiration for a signature validation based on the certificate 50, which may be separate from an expiration of the signature creation itself and the private key thereof. The expiration of the signature 48 based on the certificate 50 is set to give such signature 48 a relatively longer life span, while the expiration of the signature creation authorization itself and the private key thereof is set to give such certificate 50 and private key thereof a relatively shorter life span. Thus, even though the certificate 50 and the private key thereof may be employed only for the relatively shorter life span as the basis for signature creation on another certificate 50 or a piece of digital content 32 or the like, the signature 48 provided based on such certificate 50 has the relatively larger life span.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-readable storage medium having stored thereon a digital structure defining a digital certificate for being employed to produce a digital signature for a digital construct, the digital certificate having a public-private key pair associated therewith, the private key for being employed to produce the digital signature, the public key for being employed to validate the digital signature, the digital structure comprising:

a first field setting forth the public key associated with the digital certificate;

a second field setting forth a signature creation validity period defining for the digital certificate and the private key thereof a time period during which the digital certificate and the private key thereof are to be honored as valid for producing digital signatures; and a third field separate from the second field and setting forth a certificate validity period defining for each digital signature produced based on the digital certificate a time period different from said signature creation validity period during which the digital signature is to be honored as valid.

2. The medium of claim 1, wherein the signature creation validity period is a relatively shorter time period and the certificate validity period is a relatively longer time period.

3. The medium of claim 1, wherein the data structure further comprises a fourth field setting forth at least one type of digital construct that may be signed based on the digital certificate.

4. The medium of claim 1, wherein the digital structure defines the digital certificate according to an eXtensible Markup Language (XML) that defines a standard with both the certificate validity period and the signature creation validity period.

5. The medium of claim 4, wherein the XML-defined standard is the MPEG Rights Expression Language (REL) as approved by the International Organization for Standardization (ISO).

6. The medium of claim 1, wherein each of the signature creation validity period and the certificate validity period is set forth within the digital structure as a policy including a particular principal, a right granted to the principal, a type of digital construct with which the right can be exercised, and constraints on the right, the constraints including a time period.

7. The medium of claim 1, wherein the digital structure includes a plurality of policies, each with regard to one of a signature creation validity period and a certificate validity period, each policy including a particular principal, a right granted to the principal, a type of digital construct with which the right can be exercised, and constraints on the right, the constraints including a time period.

8. The medium of claim 1, wherein the digital structure comprises a plurality of the signature creation validity periods, each signature creation validity period being set forth within the digital structure as a policy including a particular principal, a right granted to the principal, a type of digital construct with which the right can be exercised, and constraints on the right, the constraints including the time period corresponding to the signature creation validity period.

9. The medium of claim 1, wherein the digital structure comprises a plurality of the certificate validity periods, each certificate validity period being set forth within the digital structure as a policy including a particular principal, a right granted to the principal, a type of digital construct with which the right can be exercised, and constraints on the right, the constraints including the time period corresponding to the certificate validity period.

10. The medium of claim 1, wherein the digital structure includes a plurality of policies, each with regard to a right or condition that is to be honored in connection with use of the digital construct, each policy including a particular principal, a right granted to the principal, a type of digital construct with which the right can be exercised, and constraints on the right.

11. A computer-readable storage medium having stored thereon a digital structure defining a digital construct with a digital signature and an attached chain including a digital certificate having been employed to produce the digital signature for the digital construct, the digital certificate having a public-private key pair associated therewith, the private key having been employed to produce the digital signature, the public key for being employed to validate the digital signature, the digital structure comprising:

a first field setting forth the public key associated with the digital certificate;

a second field setting forth a signature creation validity period defining for the digital certificate and the private key thereof a time period during which the digital certificate and the private key thereof are to be honored as valid for producing digital signatures of the digital construct; and a third field separate from the second field and setting forth a certificate validity period defining for the digital signature of the digital construct as produced based on the digital certificate a time period different from said signature creation validity period during which the digital signature of the digital construct is to be honored as valid.

12. The medium of claim 11, wherein the signature creation validity period is a relatively shorter time period and the certificate validity period is a relatively longer time period.

13. The medium of claim 11, wherein the data structure further comprises a fourth field setting forth at least one type of digital construct that may be signed based on the digital certificate.

14. The medium of claim 11, wherein the digital structure defines the digital certificate according to an eXtensible Markup Language (XML) that defines a standard with both the signature creation validity period and the certificate validity period.

15. The medium of claim 14, wherein the XML-defined standard is the MPEG Rights Expression Language (REL) as approved by the International Organization for Standardization (ISO).

16. The medium of claim 11, wherein each of the signature creation validity period and the certificate validity period is set forth within the digital certificate as a policy including a particular principal, a right granted to the principal, a type of digital construct with which the right can be exercised, and constraints on the right, the constraints including a time period.

17. The medium of claim 11, wherein the digital certificate includes a plurality of policies, each with regard to one of a signature creation validity period and a certificate validity period, each policy including a particular principal, a right granted to the principal, a type of digital construct with which the right can be exercised, and constraints on the right, the constraints including a time period.

18. The medium of claim 11, wherein the digital certificate comprises a plurality of the signature creation validity periods, each signature creation validity period being set forth within the digital certificate as a policy including a particular principal, a right granted to the principal, a type of digital construct with which the right can be exercised, and constraints on the right, the constraints including the time period corresponding to the certificate validity period.

19. The medium of claim 11, wherein the digital certificate comprises a plurality of the certificate validity periods, each certificate validity period being set forth within the digital certificate as a policy including a particular principal, a right granted to the principal, a type of digital construct with which the right can be exercised, and constraints on the right, the constraints including the time period corresponding to the signature validity period.

20. The medium of claim 11, wherein the digital certificate includes a plurality of policies, each with regard to a right or condition that is to be honored in connection with use of the digital construct, each policy including a particular principal, a right granted to the principal, a type of digital construct with which the right can be exercised, and constraints on the right.

* * * * *